July 5, 1927.

J. E. BOLLMAN 1,634,568

ADVERTISING SIGN

Filed April 19, 1923        2 Sheets-Sheet 1

INVENTOR.
John E. Bollman.
By Wilson & McCanna
ATTYS.

WITNESS-

July 5, 1927.
J. E. BOLLMAN
1,634,568
ADVERTISING SIGN
Filed April 19, 1923    2 Sheets-Sheet 2
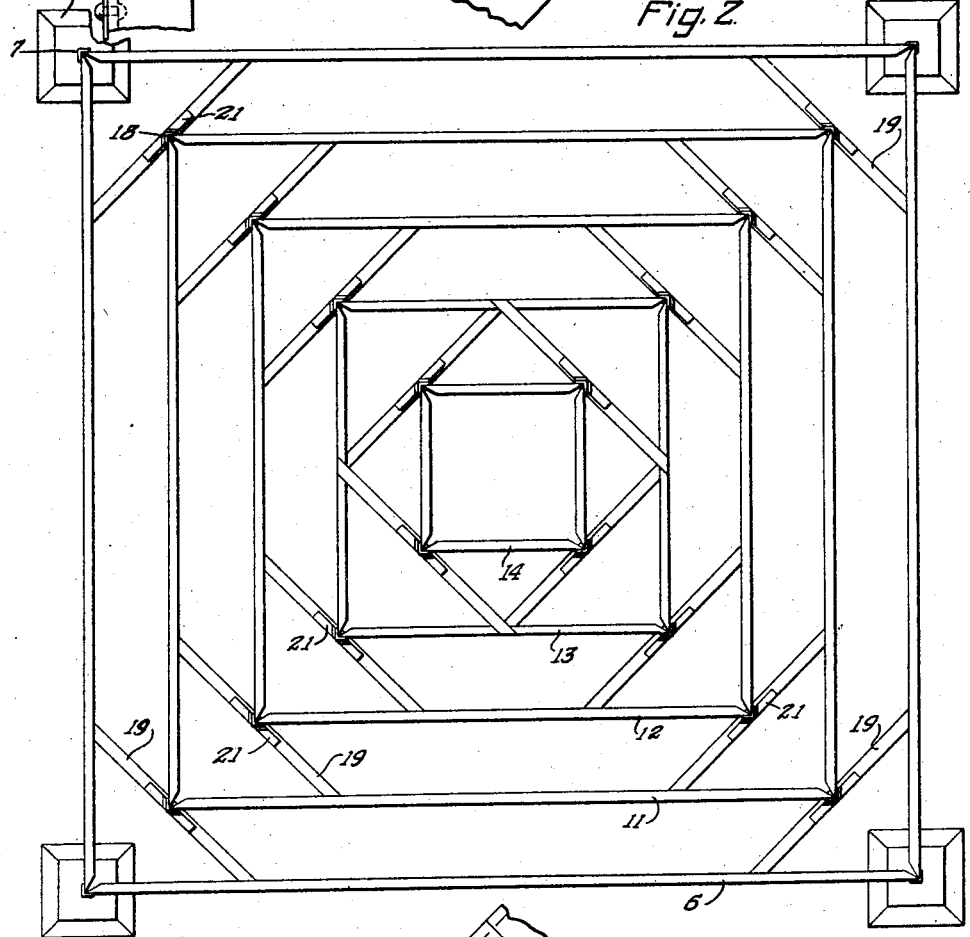
INVENTOR.
John E. Bollman.
By Wilson & McCanna
ATTYS.

Patented July 5, 1927.

1,634,568

UNITED STATES PATENT OFFICE.

JOHN E. BOLLMAN, OF ROCKFORD, ILLINOIS.

ADVERTISING SIGN.

Application filed April 19, 1923. Serial No. 633,057.

This invention relates in general to advertising signs, and has more particular reference to illuminated signs such as are adapted for display advertisements along roads and highways.

One of the principal objects of my invention is the provision of an advertising sign characterized by its stepped pyramidal form. The upright walls of the pyramidal sides provide sign boards set back from and above one another and being graduated in size in accordance with the proportions of the pyramidal structure. These sign boards being set off individually display their respective advertisements in a more striking manner than if the same were painted or fixed to a single mono-plane sign board. By individually illuminating the respective sign boards as contemplated by the present invention, they are made more distinctive and clearer than if illuminated collectively from one or more sources.

Another object is to provide an advertising sign of the character described, the pyramidal structure of which obviates the unsightly props, braces and other supporting structure visible on road signs and the like now in general use.

I have aimed to provide an illuminated advertising sign of such novel construction as to be particularly well suited and desirable for use along automobile highways and the like, and especially at intersections and corners or turns in the road, at which locations all sides of the sign are visible to the passers-by.

Still another object is the provision of an advertising sign of novel construction which may be built at a low cost in comparison with the amount of display space, which will be commanding in appearance, and which will be rigid and durable against wind pressure.

Other objects and attendant advantages will be appreciated by those skilled in this art as the invention becomes better understood by reference to the following description when considered in connection with the accompanying drawings, in which—

Figure 1 is a side elevation partly in vertical section of an advertising sign embodying my invention;

Fig. 2 is a top view of the sign;

Fig. 3 is an enlarged vertical section taken substantially on the line 3—3 of Fig. 1;

Fig. 4 is an enlarged fragmentary top view showing the detail at one of the corners; and Fig. 5 is a similar view in horizontal section showing attachment of one of the corner posts to the frame structure below.

My invention contemplates in its broader aspect, the provision of a stepped, pyramidal sign, the frame or body of which may be constructed in any suitable manner. For the purpose of a road sign, it is desired that the individual signs shall be approximately seven feet high. According to the present invention, I superpose a number of these signs in stepped relation forming pyramidal sides, the whole structure being supported at such elevation that the lowermost sign will be above any bushes or other low vegetation and free from interference or damage by live stock. A structure of this character assumes fairly large proportions and a commanding appearance. The stepped, pyramidal arrangement of the signs makes them particularly attractive and gives a clear distinctive, neat display when illuminated.

In the present instance, I have shown for illustrative purpose merely, one form of my invention, in which the several steps of the sign are made up of individual frame structures superposed one upon another. Thus a base sign structure designated generally by 6 having corner posts 7 embedded in concrete anchor posts 8, constitutes the lowermost step, and the external vertical walls 9 of such base structure provide sign boards upon which advertising matter may be painted or affixed. Additional similar structures designated generally by 11, 12, 13 and 14 of equal height but of less base area are superposed above the structure 6 in pyramidal relation. The external vertical wall of each sign structure provides a sign board, and it will be manifest that these sign boards are duplicated on each side of the pyramid according to the number of sides thereof.

The pyramidal sign may have three or more sides, each composed of a series of individual signs of about the same height but distinctly diminishing in width in abrupt steps from the base to the apex, and arranged in stacked or superposed relation in the order of their widths. The structure shown is square and consequently has four sign-displaying sides. While this pyramidal structure might be built up in any of various ways, I have shown it as composed of the rectangular structures above referred to, in superposed relation. Each sign structure is composed of an angle-iron frame having upper, lower and intermediate horizontal bars 15, 16 and 17 respectively joined by corner angle-iron bars 18 and braced diagonally across the corners between structures by similar bars 19. Each sign structure above the base sign structure rests on the braces 19 therebelow, and is secured thereto by means of brackets 21 bolted or riveted to its corner angles 18, as shown in Fig. 5. By this means, each sign structure is supported and secured in position. The outer side of each such sign board structure is covered by a sheet metal wall providing a sign board. These sign boards are coextensive with the length and height of each side of the sign structures referred to, and thus provide individual signs, each set off from the other due to the distinct stepped arrangement in different vertical and horizontal planes. It will be observed that by reason of this arrangement of signs, there are no unsightly struts, braces and other frame structures exposed to view as is common with those signs which face only in one direction, or are open at one side. Also the top of each sign structure provides a support for a work platform for workmen painting or posting advertising on the signs on the next structure above.

My invention also provides for individually illuminating the signs so that no shadows will be cast on display surfaces and the signs will be clear and very effective. I have aimed to conceal the lighting means, and to this end I mount along the rear upper edge of each sign board, a row of electric light bulbs 22 and reflectors 23, these being directed upwardly and inwardly to illuminate the sign board next above. As shown in Fig. 3, the electric bulbs and reflectors are carried by a suitable fixture in the form of a pipe 24 extending from end to end of each sign board and supported by means of brackets 25 bolted to the top angle bar 15. The sign boards on the base sign structure are illuminated by lights and reflectors indicated by 26 carried by overhanging brackets 27.

It is believed that the foregoing conveys a clear understanding of the objects prefaced above and of the advantages mentioned. It should also be noted that the pyramidal structure while being relatively high, affords convenient and easy access to the several sign boards for painting and to the lighting means for inspection and maintenance, this by reason of the fact that a platform is provided around each sign board and these platforms are easily accessible by suitable ladders or steps from one to another. It should be understood, therefore, that changes might be made in the construction and arrangement without departing from the spirit and scope of the invention as expressed in the appended claims.

I claim:

1. A road sign comprising a base, a series of frame structures superposed one above another on said base, each having a noticeably smaller base than its supporting structure and its vertical walls providing sign boards which collectively comprise a definitely stepped pyramidal display, the steps being wide enough to provide places where boards may be supported to serve as working platforms for workmen to stand on when placing advertising matter on the sign boards, and means for illuminating said sign at night, said means when mounted on the sign itself being preferably disposed on the sign boards beneath the ones to be illuminated and positioned at the rear and adjacent to the top thereof so as to direct the light rays upwardly and inwardly to the sign boards to be illuminated.

2. A road sign comprising a base structure anchored at its corners, a series of frame structures superposed one above another on said base, each having a noticeably smaller base than its supporting structure and its vertical walls providing sign boards which collectively comprise a distinctly stepped, pyramidal display, and means for illuminating certain of said sign boards, said means being located on the frame structure of the sign boards next below and being positioned at the rear and adjacent to the top thereof and arranged to direct the rays upwardly and inwardly.

JOHN E. BOLLMAN.